(12) United States Patent
Tsuruta et al.

(10) Patent No.: US 6,523,434 B2
(45) Date of Patent: Feb. 25, 2003

(54) ROTARY SHIFT SELECTING APPARATUS FOR VEHICLE

(75) Inventors: Yuichiro Tsuruta, Wako (JP); Shinichi Karube, Wako (JP); Shigeaki Oda, Shizuoka-ken (JP); Takayuki Suzuki, Shizuoka-ken (JP); Junji Matsumoto, Shizuoka-ken (JP)

(73) Assignees: Honda Giken Kogyo Kabushiki Kaisha, Tokyo (JP); Kabushiki Kaisha Atsumitec, Shizuoka-ken ( * ) Notice: Subject to any disclaimer, the term of this patent is extended or adjusted under 35 U.S.C. 154(b) by 0 days.

(21) Appl. No.: 09/804,202

(22) Filed: Mar. 13, 2001

(65) Prior Publication Data
US 2001/0035064 A1 Nov. 1, 2001

(30) Foreign Application Priority Data

Mar. 30, 2000 (JP) ........................................ 2000-095629
Sep. 29, 2000 (JP) ........................................ 2000-301134

(51) Int. Cl.⁷ ................................................ G05G 1/00
(52) U.S. Cl. ........................................................ 74/566
(58) Field of Search ............................. 74/480 B, 502.4, 74/566, 18.1, 504; 116/28.1; 277/100; 180/90.6

(56) References Cited

U.S. PATENT DOCUMENTS 4,029,324 A * 6/1977 Berkes ........................ 277/507
4,191,064 A * 3/1980 Houk et al. ................. 116/28.1

FOREIGN PATENT DOCUMENTS

| JP | 7132751 | 5/1995 |
| JP | 986206 | 3/1997 |
| JP | 986208 | 3/1997 |
| JP | 995154 | 4/1997 |
| JP | 9132049 | 5/1997 |
| JP | 9220944 | 8/1997 |

* cited by examiner

Primary Examiner—Jack Lavinder
Assistant Examiner—C. T. Bartz
(74) Attorney, Agent, or Firm—Birch, Stewart, Kolasch & Birch, LLP

(57) ABSTRACT

It is an object of the invention to provide a rotary shift selecting apparatus for a vehicle capable of obtaining excellent operability while securing the liquid-proof ability. A rotary shift selecting apparatus for a vehicle comprising a base body 21 mounted to a vehicle frame, and a rotor 23 rotatably mounted to a supporting shaft 22 fixed to the base body 21 for selecting shift, wherein an annular fitting portion 24 which is coaxial of said supporting shaft 22 is formed between said base body 21 and said rotor 23, and an annular seal material 25/26 is interposed between said fitting portion 24 and a passing-through portion of said supporting shaft 22 of said rotor 23.

2 Claims, 7 Drawing Sheets

ROTARY SHIFT SELECTING APPARATUS FOR VEHICLE

BACKGROUND OF THE INVENTION

1. Field of the Invention

The present invention relates to a rotary shift selecting apparatus for a vehicle connected to a transmission of an engine mounted to the vehicle for changing a shift position of the transmission.

2. Prior Art

Conventionally, a three-wheeled or four-wheeled straddle type vehicle for example includes a transmission such as an automatic transmission mounted to an engine, and a shift selecting apparatus for changing a shift position of the transmission.

As a conventional example of a vehicle having such a shift selecting apparatus, one having a structure shown in FIGS. 3 and 4 is known.

In these drawings, the vehicle designated with a symbol 1 is a four-wheel straddle type vehicle.

This vehicle 1 includes a vehicle body frame 2, front wheels 3 mounted to opposite sides of a front portion of the vehicle body frame 2, rear wheels 4 mounted to opposite sides of a rear portion of the vehicle body frame 2 and provided upper portions of the front portion of the vehicle body frame 2, a steering wheel 5 for steering the front wheels 3, a fuel tank 6 disposed behind the steering wheel 5, a seat 7 mounted behind the fuel tank 6, front fenders 8 provided such as to cover upper portions of the front wheels 3, and rear fenders 9 provided such as to cover upper portions of the rear wheels 4. As shown in FIG. 4, brakes 10 and 11 are mounted to opposite ends of the steering wheel 5 for braking the vehicle 1.

An engine 12 having a transmission (not shown) comprising an automatic transmission and the like is mounted below the fuel tank 6 and the seat 7. A shift selecting apparatus 13 connected to the transmission is disposed on the side of the fuel tank 6.

As shown in FIG. 5, the shift selecting apparatus 13 comprises a base body 14, an operating rod 15 rotatably mounted to the base body 14 for operating the shift selecting apparatus 13. A bellows boot 16 is mounted between the operating rod 15 and the base body 14 such as to cover a clearance therebetween.

The operating rod 15 is provided therein with various mechanisms for limiting the operating modes (such as reverse lock mechanism) of the operating rod 15 in some cases. In order protect these mechanisms in the operating rod 15 from water and the like, a protecting cover is mounted to the operating rod 15, an O-ring or the like is mounted between the protecting cover and the operating rod 15 to prevent water from entering into the protecting cover.

In such a conventional shift selecting apparatus 13, since there exist the boot 16 between the operating rod 15 and the base body 14, oscillation range of the operating rod 15 is limited. Further, when the operating rod 15 is operated, the elasticity of the boot 16 acts as resistance against the operation, and there is a problem that the operating feeling becomes firm.

Further, in the case of the water-proofing structure in which the operating rod 15 is provided with the protecting cover, and the O-ring is provided between the protecting cover and the operating rod 15, not only the number of parts is increased, but also the number of assembling steps is increased.

SUMMARY OF THE INVENTION

The present invention has been accomplished in view of the above conventional problems, and it is an object of the invention to provide a rotary shift selecting apparatus for a vehicle capable of obtaining excellent operability while securing the liquid-proof ability.

To achieve the above object, according to claim 1 of the present invention, there is provided a rotary shift selecting apparatus for a vehicle comprising a base body mounted to a vehicle frame, and a rotor rotatably mounted to a supporting shaft fixed to the base body for selecting shift, wherein an annular fitting portion which is coaxial of the supporting shaft is formed between the base body and the rotor, and an annular seal material is interposed between the fitting portion and a passing-through portion of the supporting shaft of the rotor.

According to claim 2 of the invention, in the rotary shift selecting apparatus for a vehicle according to claim 1, an operating rod is integrally mounted to a side portion of the rotor along its radial direction, a shift knob whose surface is covered with a protecting cover is mounted to a tip end of the operating rod through a predetermined length thereof, the protecting cover is formed with an insertion port to which the operating rod is inserted, the insertion port is formed at its inner face with a perimeter projection which is brought into contact under pressure with a front perimeter of an outer peripheral surface of the operating rod.

DETAILED DESCRIPTION OF THE PREFERRED EMBODIMENTS

An embodiment of the present invention will be explained with reference to FIGS. 1 and 2.

Figure 3:
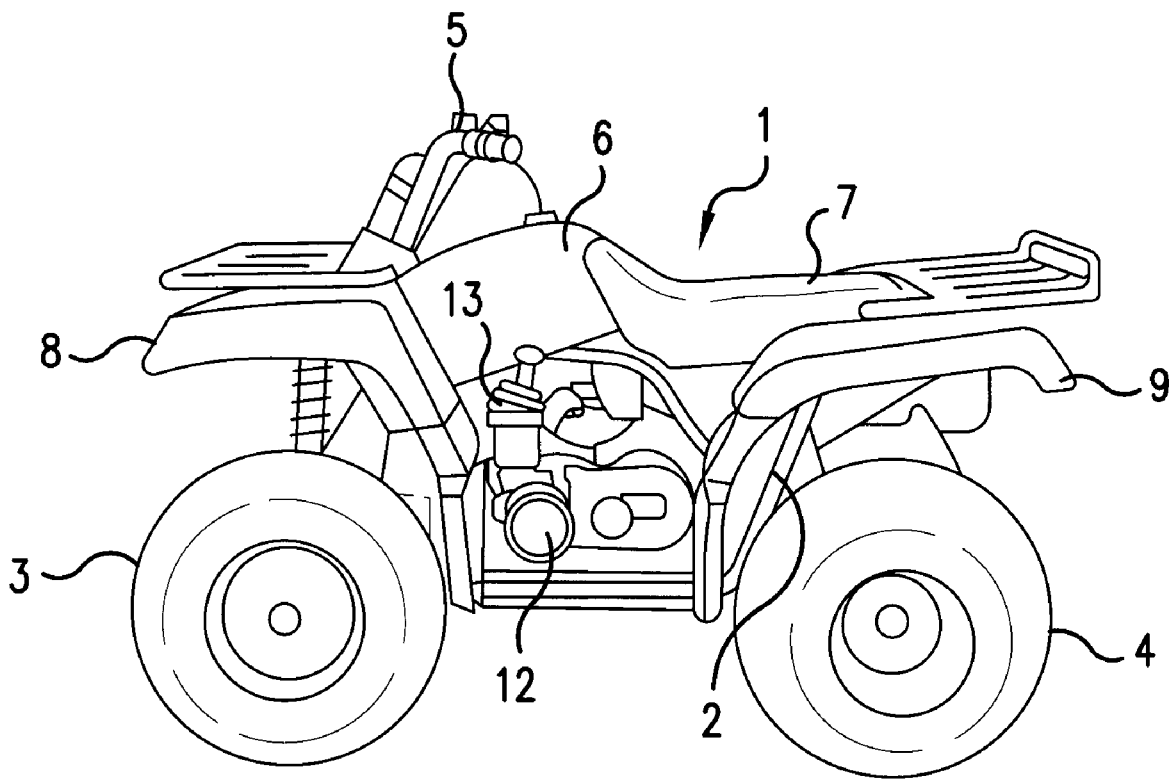
FIG. 3 is a side view of a vehicle to which a conventional shift selecting apparatus is mounted.
Figure 4:
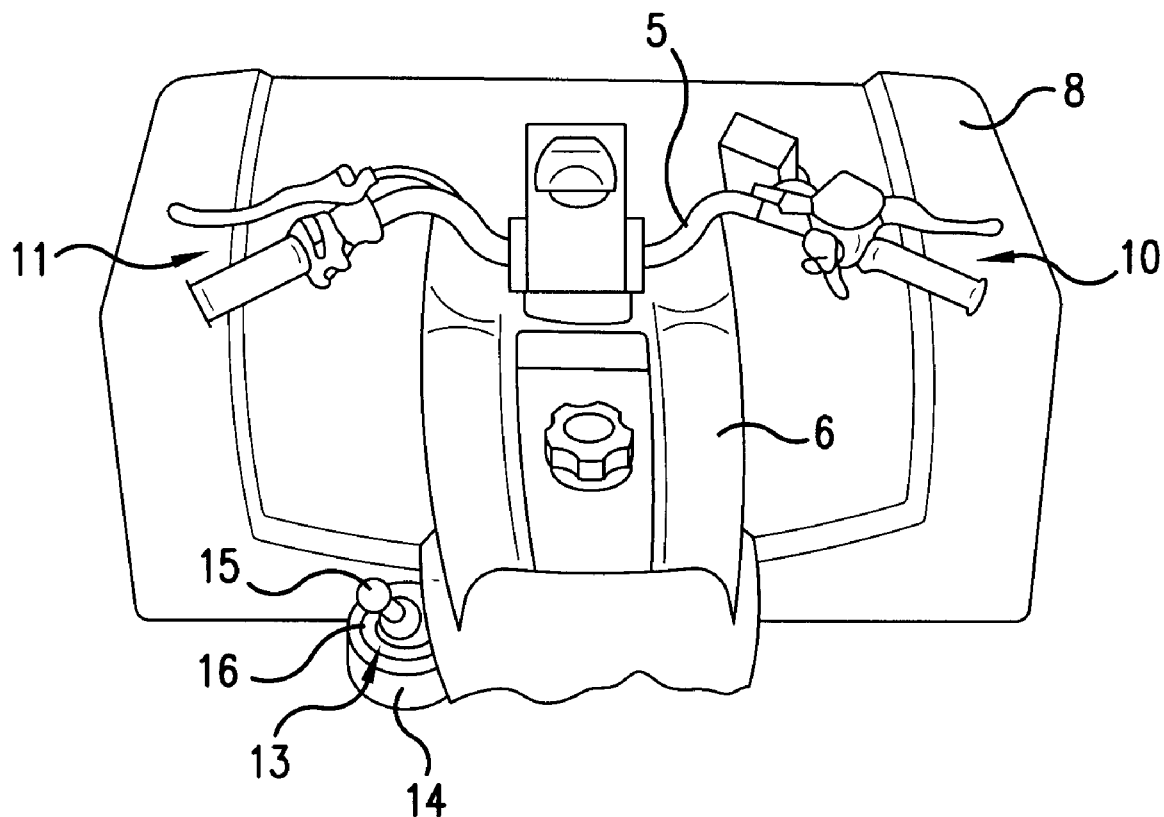
FIG. 4 is a plane view of a front portion of the vehicle shown in FIG. 3.
Figure 5:
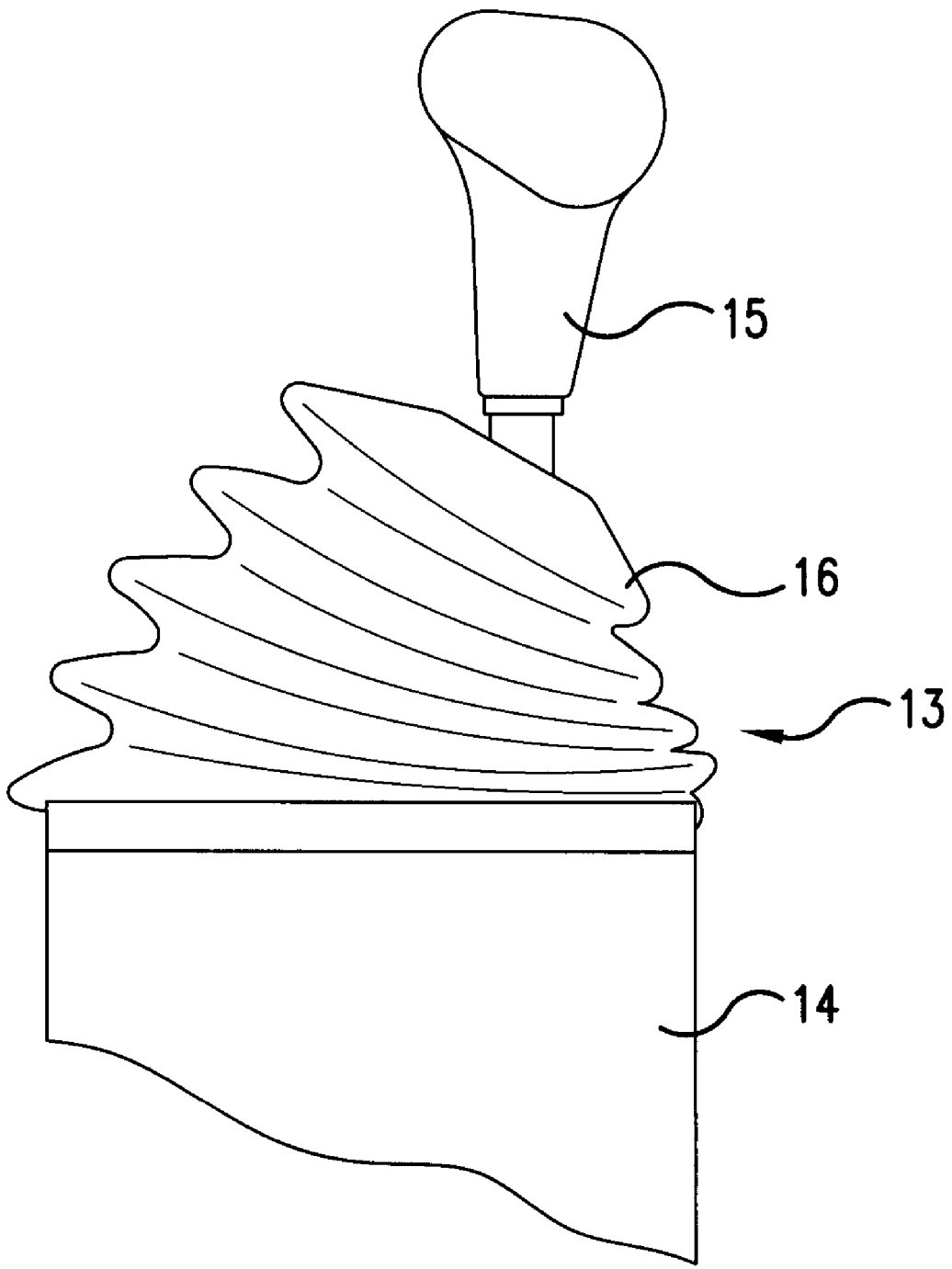
FIG. 5 is a side view of the conventional shift selecting apparatus.

In the following explanation, a main structure of the vehicle is common to the prior art shown in FIGS. 3 and 4, the common portions are designated with the same symbols in the following explanation also.

Figure 1:
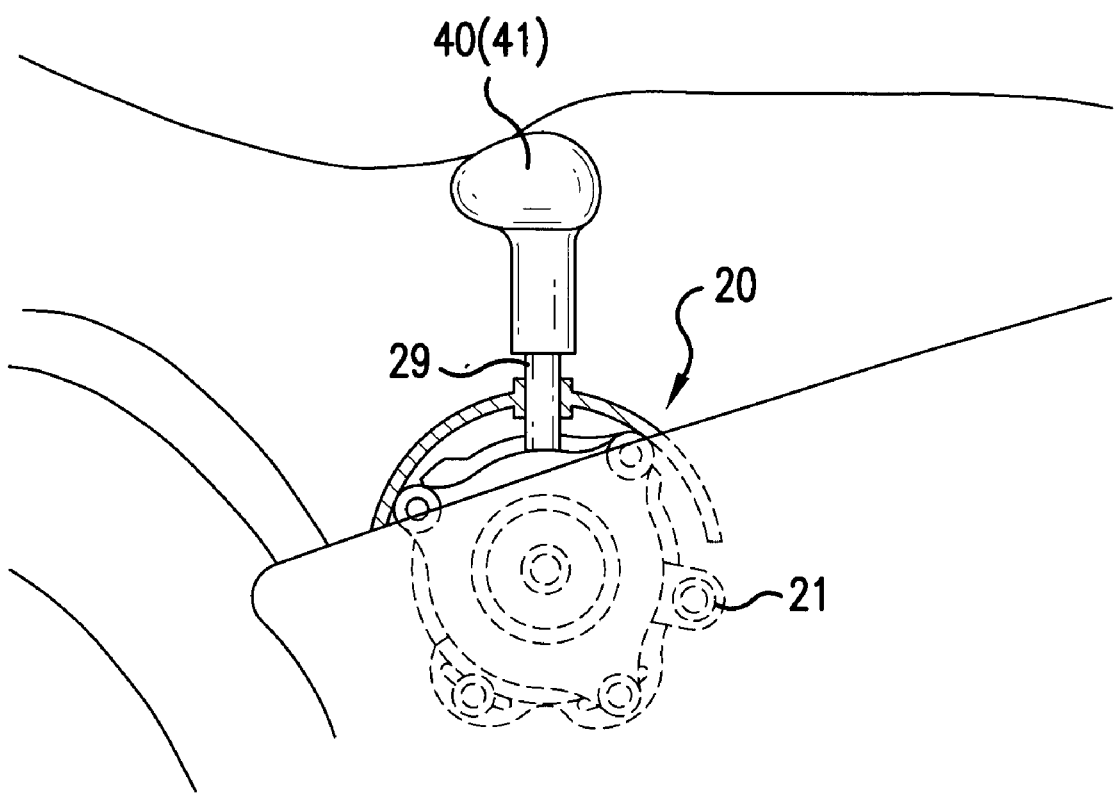
FIG. 1 is a side view showing an embodiment of the present invention.

A shift selecting apparatus of the present embodiment designated with a symbol 20 in FIG. 1 is mounted to a side of a vehicle body frame 2, and connected to a transmission (not shown) provided in an engine 12 as in the prior art.

Figure 2:
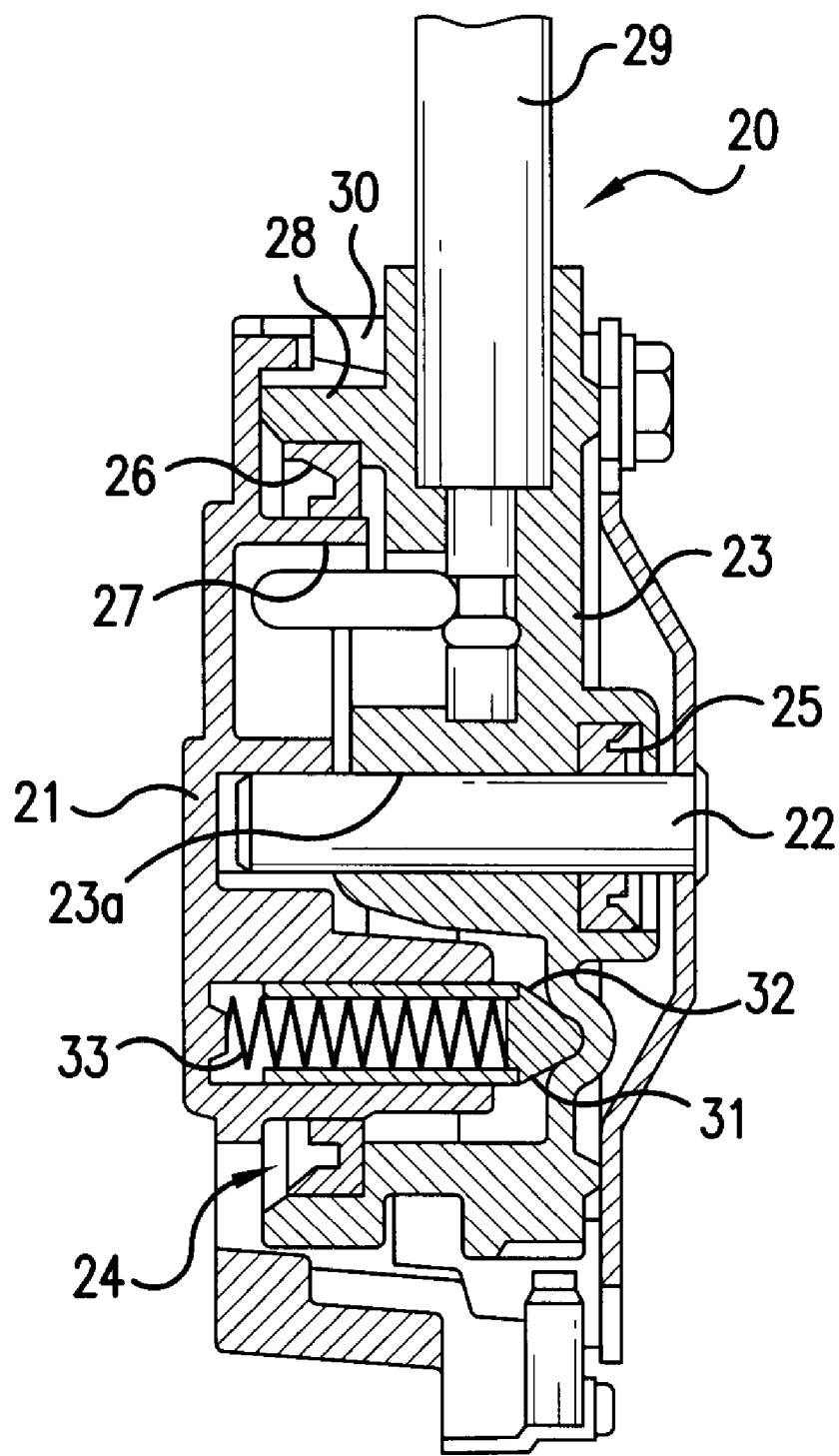
FIG. 2 is a vertical sectional view of an essential portion showing the embodiment of the invention.

As shown in FIG. 2, this shift selecting apparatus 20 includes a base body 21 mounted to the vehicle body frame 2, and a rotor 23 rotatably mounted to a supporting shaft 22 fixed to the base body 21 for selecting a shift. An annular fitting portion 24 which is coaxial with the supporting shaft 22 is formed between the base body 21 and the rotor 23. An annular seal material 25 is interposed between a passing-through portion 23a of the supporting shaft 22 and the rotor 23, and an annular seal material 26 is interposed between the fitting portion 24 and the rotor 23.

Details of the structure will be explained next. The fitting portion 24 between the base body 21 and the rotor 23 comprises an annular projection 27 of the base body 21 formed between opposed faces of the base body 21 and the rotor 23, and an annular projection 28 of the rotor 23 formed between opposed faces of the base body 21 and the rotor 23. The projection 28 is superposed at a predetermined distance on an outer side of the projection 27 formed on the base body 21.

The projection 27 formed on the base body 21 is formed coaxially with the supporting shaft 22 fixed to the base body 21. The projection 28 formed on the rotor 23 is formed coaxially with the passing-through portion 23a of the supporting shaft 22. With this structure, in a state in which the rotor 23 is mounted to the supporting shaft 22, the projections 27 and 28 are fitted to each other at the predetermined distance therebetween.

An operating rod 29 is integrally mounted to a side of the rotor 23 along its turning radial direction. A notch 30 into which the operating rod 29 is inserted is formed in a side of the base body 21.

The notch 30 is formed over the entire oscillation range of the operating rod 29.

The rotor 23 is formed with a plurality of recesses 31 provided for holding the rotor 23 at a predetermined shift position. If a locking pin 32 slidably mounted to the base body 21 is resiliently fitted into one of the recesses 31 by a spring 33, the rotor 23 is held at a selected select position.

The rotor 23 is connected to the transmission of the engine 12 through a wire (not shown) or the like.

Figure 6:
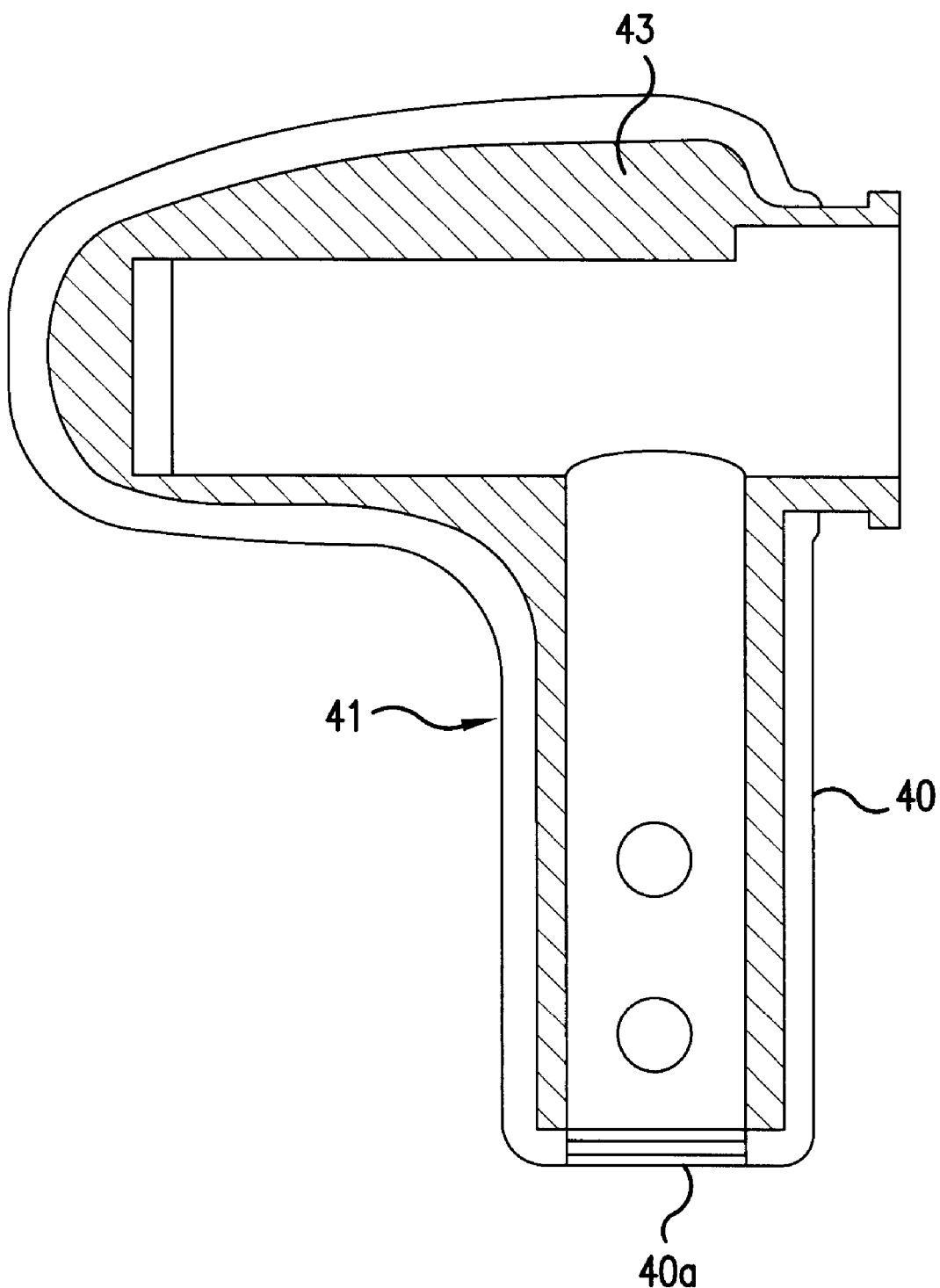
FIG. 6 is a vertical sectional view of a shift knob mounted to a tip end of an operating rod according to another embodiment of the invention.
Figure 7:
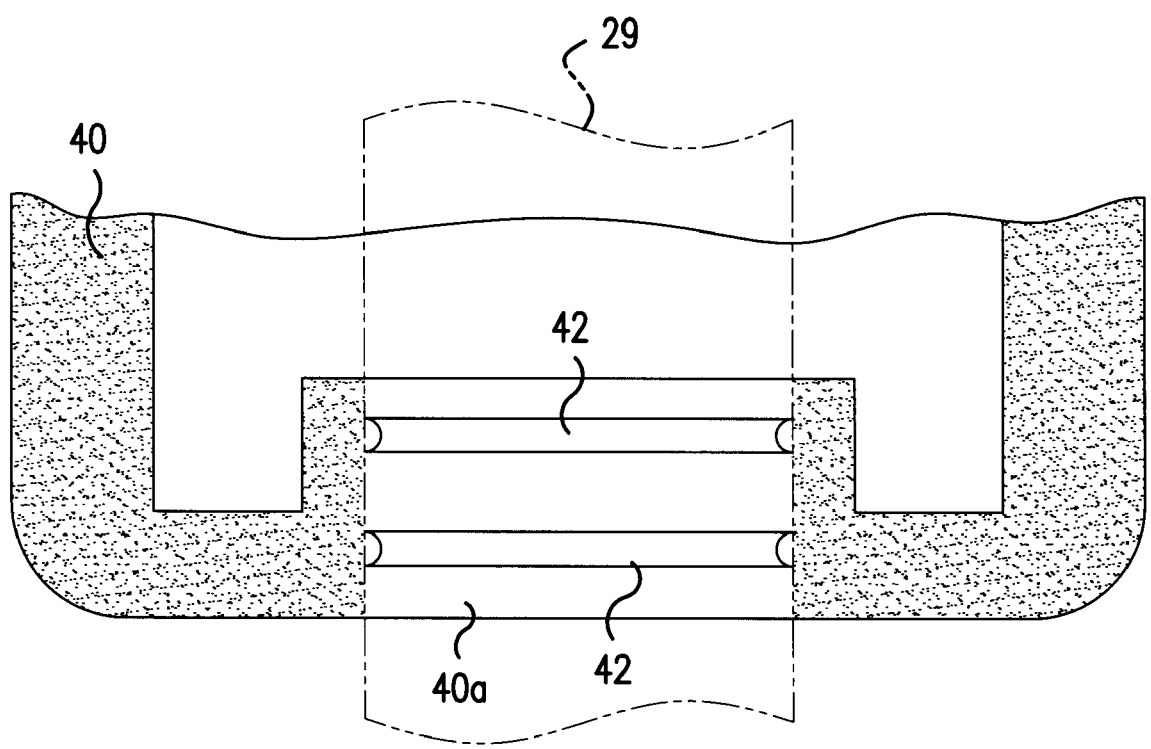
FIG. 7 is an enlarged vertical sectional view of an essential portion of a shift knob mounted to a tip end of an operating rod according to another embodiment of the invention.

A shift knob 41 whose surface is covered with a protecting cover 40 made of resin is mounted to a tip end of the operating rod 29. The protecting cover 40 is formed with an insertion port 40a into which the operating rod 29 is inserted. As shown in FIGS. 6 and 7, two perimeter projections 42 are formed on an inner face of the insertion port 40a. The perimeter projections 42 are brought into contact under pressure with a front perimeter of an outer peripheral surface of the operating rod 29.

The two perimeter projections 42 are formed at a distance from each other in a center line direction of the insertion port 40a.

An interior of the shift knob 41 is formed as a metal inner 43, operation limiting mechanisms (such as a reverse lock mechanism and the like) for the operating rod 29 are mounted in the inner 43.

In the shift selecting apparatus 20 according to the present embodiment having such a structure, a shift position of the transmission is changed by operating the operating rod 29 to turn the rotor 23 around the supporting shaft 22.

When such an operation is carried out, the rotor 23 slides on contact surfaces of both the seal materials 25 and 26 and is turned.

Therefore, when the operating rod 29 is operated, the seal materials 25 and 26 are not deformed, a resistance caused when the operating rod 29 is operated is only the sliding resistance with respect to the seal materials 25 and 26 and thus, the operating force of the operating rod 29 is reduced. Further, since the sliding resistance is constant irrespective of turning position of the rotor 23, the turning range is not limited.

Further, the relative turning portion of the rotor 23 with respect to the base body 21 is sealed by the seal materials 25 and 26 and thus, water or dust does not enter the base body 21.

As shown in FIGS. 6 and 7, in a state in which the protecting cover 40 provided for covering the surface of the shift knob 41 fitted to the tip end of the operating rod 29 mounts the shift knob 41 to the tip end of the operating rod 29, the perimeter projection 42 is formed in the insertion port 40a of the protecting cover 40. Therefore, the space between the protecting cover 40 and the operating rod 29 is sealed liquid-tightly and as a result, it is possible to obtain water-proof function for the various apparatuses disposed in the shift knob 41.

Further, since the perimeter projection 42 is integrally formed together with the protecting cover 40, it is possible to obtain the water-proof function with a simple operation without increasing the number of parts.

Shape, size and the like of each the constituting member shown in the above embodiment is only an example, and they can variously be changed in accordance with requirements of design.

As explained above, according to the rotary shift selecting apparatus for a vehicle of the invention, at the time of shift selecting operation, the rotor slides on contact surfaces of both the seal materials and is turned. Therefore, at the time of operation, both the seal materials are prevented from being deformed, a resistance caused when the operating rod is operated is only the sliding resistance with respect to both the seal materials and thus, the operating force of the operating rod is reduced. Further, since the sliding resistance is constant irrespective of turning position of the rotor, the turning range is not limited.

Further, the relative turning portion of the rotor with respect to the base body is sealed by the seal materials and thus, water or dust can be prevented from entering the base body.

Further, in a state in which the protecting cover provided for covering the surface of the shift knob fitted to the tip end of the operating rod mounts the shift knob to the tip end of the operating rod, the perimeter projection is formed in the insertion port of the protecting cover. Therefore, the space between the protecting cover and the operating rod is sealed liquid-tightly and as a result, it is possible to obtain water-proof function for the various apparatuses disposed in the shift knob.

Further, since the perimeter projection is integrally formed together with the protecting cover, it is possible to obtain the water-proof function with a simple operation without increasing the number of parts.

What is claimed is:

1. A rotary shift selecting apparatus for a vehicle comprising:
    a base body mounted to a vehicle frame; and
    a rotor rotatably mounted to a supporting shaft fixed to the base body for selecting a shift, said rotor being mounted so as to surround said supporting shaft and said rotor being rotatable in a vertical plane,
    said rotor further formed with a plurality of recesses,
    a locking pin,
    a spring,
    said locking pin slidably mounted to the base body and resiliently fitted into one of the recesses by said spring,
    wherein an annular fitting portion which is coaxial of said supporting shaft is formed between said base body and said rotor, and an annular seal material is interposed between said fitting portion and a passing-through portion of said supporting shaft of said rotor.

2. The rotary shift selecting apparatus for a vehicle according to claim 1, wherein an operating rod is integrally mounted to a side portion of said rotor along its radial direction, and a shift knob whose surface is covered with a protecting cover is mounted to a tip end of said operating rod through a predetermined length thereof, said protecting cover being formed with an insertion port to which said operating rod is inserted, and said insertion port being formed at its inner face with a perimeter projection which is brought into contact under pressure with a front perimeter of an outer peripheral surface of said operating rod.

* * * * *